US010814935B2

(12) United States Patent
Vaisanen et al.

(10) Patent No.: US 10,814,935 B2
(45) Date of Patent: Oct. 27, 2020

(54) SNOWMOBILE REAR SUSPENSION

(71) Applicant: BRP FINLAND OY, Rovaniemi (FI)

(72) Inventors: Esa Vaisanen, Rovaniemi (FI); Mika Korsumaki, Rovaniemi (FI); Petteri Jarvinen, Rovaniemi (FI); Joonas Mahonen, Rovaniemi (FI)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 12 days.

(21) Appl. No.: 15/762,707

(22) PCT Filed: Sep. 30, 2016

(86) PCT No.: PCT/IB2016/055874
§ 371 (c)(1),
(2) Date: Mar. 23, 2018

(87) PCT Pub. No.: WO2017/056057
PCT Pub. Date: Apr. 6, 2017

(65) Prior Publication Data
US 2018/0273141 A1     Sep. 27, 2018

Related U.S. Application Data

(60) Provisional application No. 62/234,787, filed on Sep. 30, 2015.

(51) Int. Cl.
*B62M 9/16*        (2006.01)
*B62M 27/02*       (2006.01)
(Continued)

(52) U.S. Cl.
CPC ............ *B62M 27/02* (2013.01); *B62D 55/30* (2013.01); *B62M 9/16* (2013.01); *B62M 2027/026* (2013.01); *B62M 2027/027* (2013.01)

(58) Field of Classification Search
CPC .... B62M 27/00; B62M 27/02; B62M 27/026; B62M 27/027; B62M 9/16; B62D 55/00;
(Continued)

(56) References Cited

U.S. PATENT DOCUMENTS 3,658,145 A     4/1972   Bergmann et al.
3,692,132 A     9/1972   Pollanen
(Continued)

FOREIGN PATENT DOCUMENTS

RU          69825 U1    1/2008

OTHER PUBLICATIONS

International Search Report of PCT/IB2016/055874; Lee W. Young; dated Oct. 25, 2017.
(Continued)

*Primary Examiner* — Joseph M Rocca
*Assistant Examiner* — Maurice L Williams
(74) *Attorney, Agent, or Firm* — BCF LLP

(57) ABSTRACT

A rear suspension assembly for a vehicle having a chassis and an endless drive track, comprising at least one suspension arm pivotally connecting to the chassis; a pair of slide rails connected to the at least one suspension arm; at least one shock absorber assembly connected to the pair of slide rails and a rail extension assembly comprising at least one extension arm having a front end pivotally connected to a rear portion of at least one of the slide rails about a pivot axis, the at least one extension arm being pivotable between a raised position and a lowered position with respect to the pair of slide rails about the pivot axis, at least one rear idler wheel rotationally connected the at least one extension arm, and at least one biasing member biasing the at least one extension arm toward the raised position.

17 Claims, 12 Drawing Sheets

(51) Int. Cl.
  *B62D 55/08* (2006.01)
  *B62D 55/30* (2006.01)
(58) Field of Classification Search
  CPC ........ B62D 55/08; B62D 55/10; B62D 55/30; B62D 55/305
  USPC ..... 180/190, 191, 194, 9.5, 9.52, 9.56, 9.58, 180/9.6
  See application file for complete search history.

(56) References Cited

U.S. PATENT DOCUMENTS

| | | | |
|---|---|---|---|
| 3,830,323 A | 8/1974 | Voulevi | |
| 4,093,033 A | 6/1978 | Rosch | |
| 4,987,965 A | 1/1991 | Bourret | |
| 6,715,575 B2 * | 4/2004 | Karpik | B62D 55/108 180/190 |
| 6,962,222 B2 * | 11/2005 | Kirihata | B62D 55/084 180/9.21 |
| 7,802,645 B2 | 9/2010 | Mallette et al. | |
| 8,056,656 B2 * | 11/2011 | Todd | B62D 55/04 180/9.1 |
| 8,607,912 B2 | 12/2013 | Mallette et al. | |
| 2007/0029117 A1 * | 2/2007 | Goldenberg | B62D 55/075 180/9.32 |
| 2016/0121970 A1 * | 5/2016 | Labbe | B62M 27/02 180/193 |

OTHER PUBLICATIONS

English translation on RU69825U1 retrieved from https://patents.google.com/patent/ on Mar. 20, 2020.
Search Report issued from the Rospatent dated Mar. 12, 2020 in connection with the application No. 2018114717.

* cited by examiner

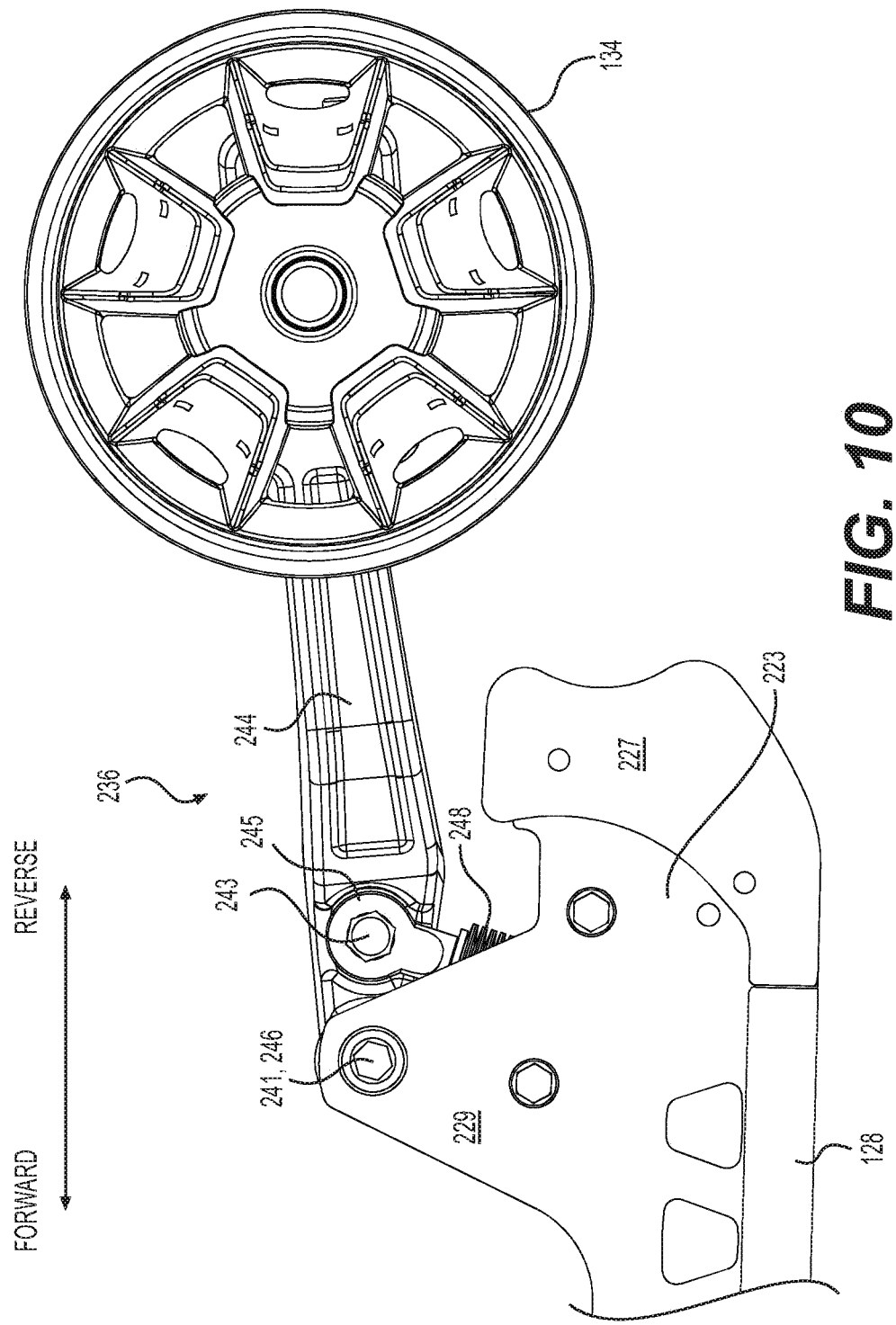

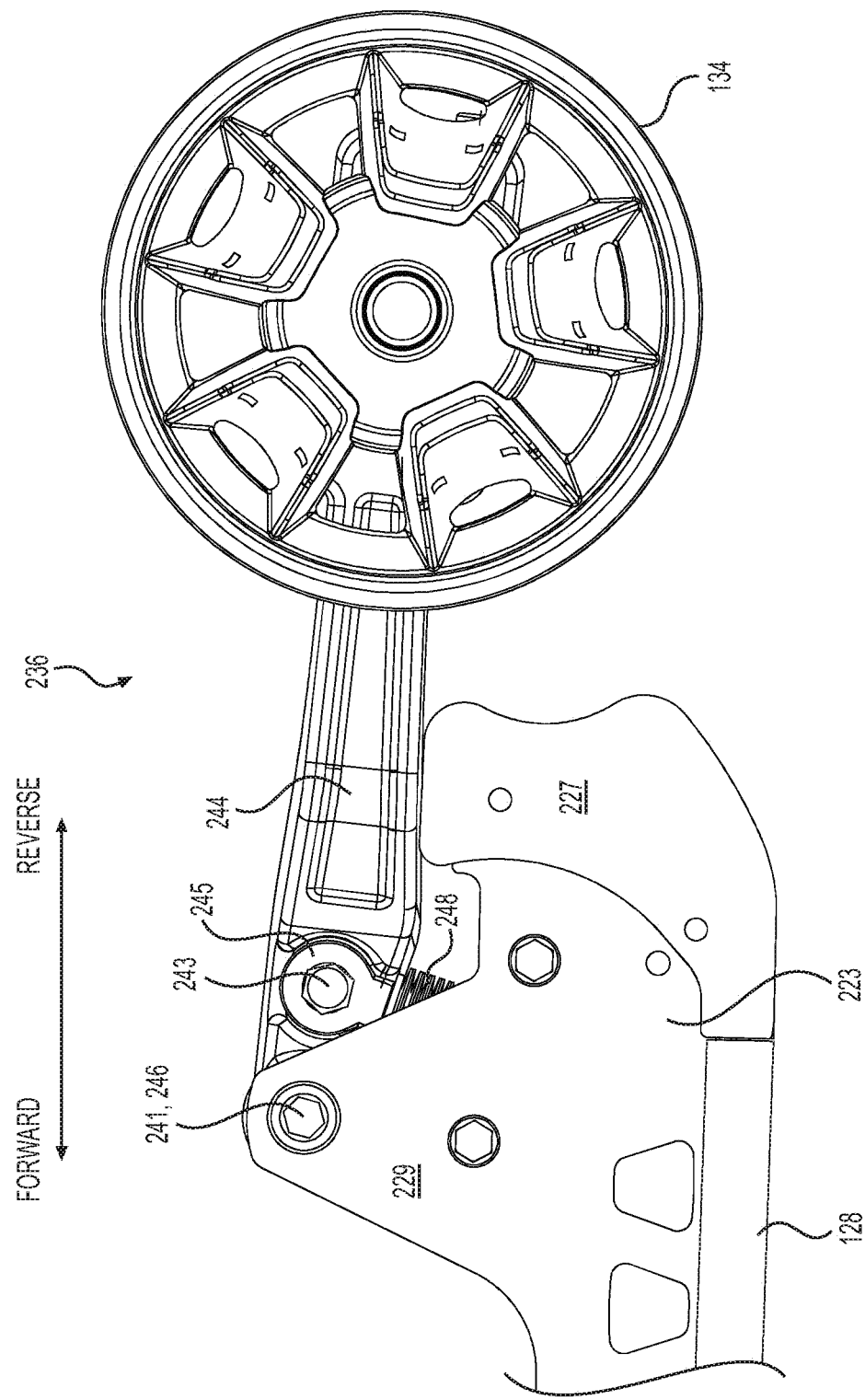

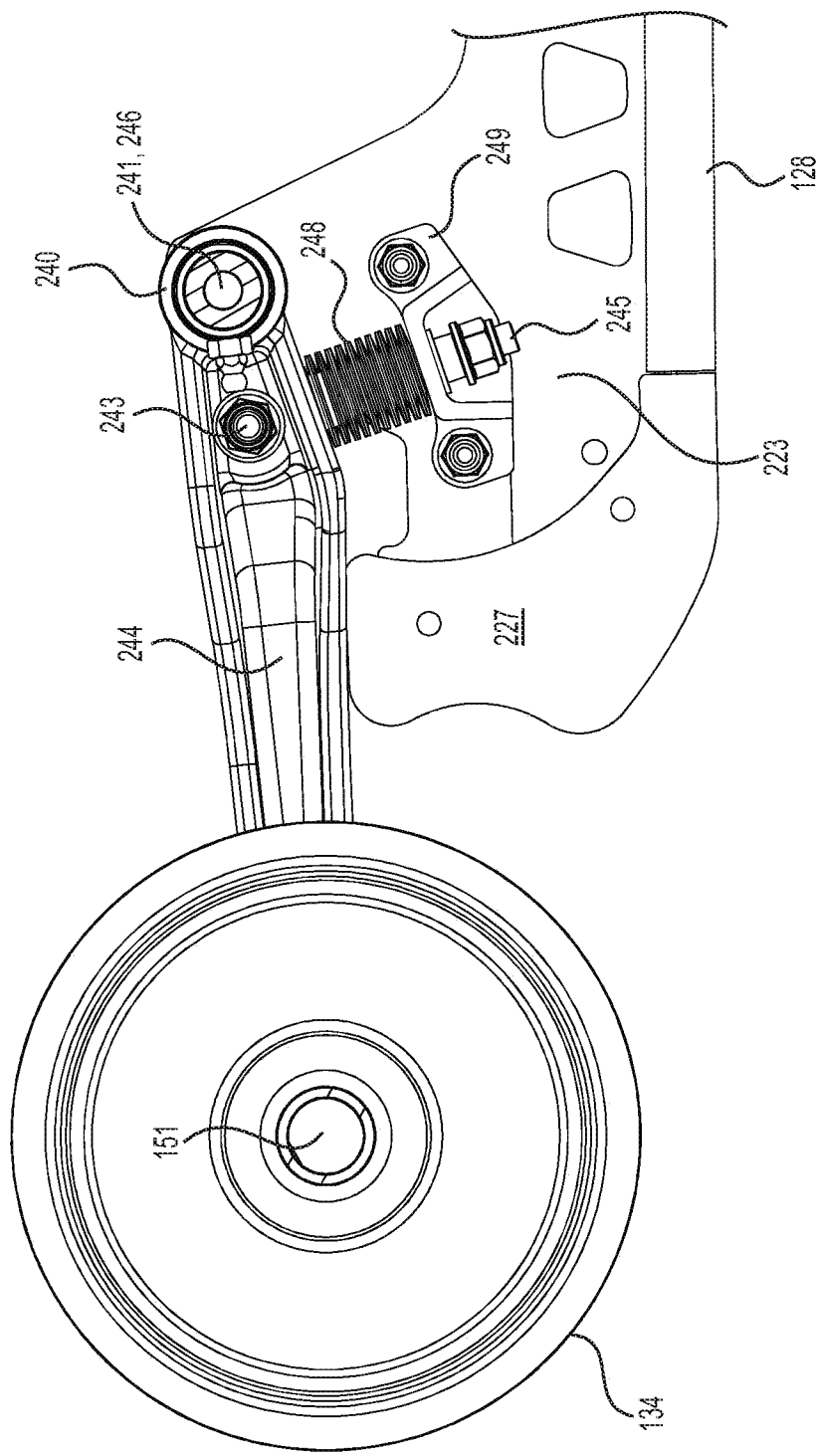

SNOWMOBILE REAR SUSPENSION

CROSS-REFERENCE

The present application claims priority to U.S. Provisional Patent Application No. 62/234,787, filed Sep. 30, 2015, the entirety of which is incorporated herein by reference.

TECHNICAL FIELD

The present technology relates to suspension assemblies for tracked vehicles, and more particularly to rear suspension assemblies for snowmobiles.

BACKGROUND

Conventionally, the rear suspension of a snowmobile supports an endless drive track that is driven by the motor to power the snowmobile. The endless drive track is tensioned to surround a pair of slide rails, a plurality of idler wheels, and at least one drive wheel or sprocket. A shock absorbing mechanism involving compressed springs and hydraulic dampers urges the slide rails away from the chassis of the snowmobile against the weight supported above the suspension in a static condition.

When a snowmobile is driven in reverse, particularly on soft snow, the rear portion of the track can dig into the snow and cause the vehicle to become stuck. In some snowmobiles, the rear suspensions are provided with a rear articulated portion that can pivot upward against a downward biasing force when sufficient force is applied to that portion of the rail. This force could be provided by contact with a bump or the pressure of the snow from underneath the articulated portion. When pivoted upward, the articulated portion provides a ramp so that when the vehicle is reversing in soft snow or over an obstacle, for example, the vehicle is continuously being pushed to the top of the snow and is prevented from becoming stuck. As soon as the upward force from the snow or obstacle is weaker than the force needed to overcome the downward biasing force, the articulated portion rotates back to its initial flat orientation.

In some conditions, such as when operating the snowmobile in reverse through very soft snow for example, the pressure on the articulated portion of the suspension may not be enough to overcome the downward biasing force. The articulated portion simply remains in its downward position and the track remains flat. In this case, there is no benefit obtained from the articulation.

There are situations, however, where it is advantageous to have the articulated portion in the downward position to increase the track length along the ground. In a situation when a snowmobile is moving forward through deep snow or towing a trailer, for example, a larger endless drive track contact area with the ground helps propel the snowmobile forward. Thus there is also an interest in having the articulated portion in a lowered position in certain conditions.

In recent years, other vehicles including, but not limited to, all-terrain vehicles (ATVs) have been equipped with endless track drive systems to adapt them for use in snowy conditions. Thus, other vehicles, including ATVs, could also benefit from improvements in suspension assemblies for tracked vehicles.

SUMMARY

It is an object of the present to ameliorate at least some of the inconveniences present in the prior art.

According to one aspect of the present technology, there is provided a rear suspension assembly for a vehicle having a chassis and an endless drive track, the rear suspension assembly comprising at least one suspension arm having a first end and a second end, the first end of the at least one suspension arm being adapted for pivotally connecting to the chassis, a pair of slide rails pivotally connected to the second end of the at least one suspension arm, at least one shock absorber assembly pivotally connected to the pair of slide rails, the at least one shock absorber assembly being adapted for biasing the pair of slide rails away from the chassis and a rail extension assembly comprising at least one extension arm having a front end pivotally connected to a rear portion of at least one of the pair of slide rails about a pivot axis, the at least one extension arm being pivotable between a raised position and a lowered position with respect to the pair of slide rails about the pivot axis, at least one rear idler wheel rotationally connected to a rear portion of the at least one extension arm and at least one biasing member biasing the at least one extension arm toward the raised position.

In some implementations, rear suspension assembly further comprises at least one stopper joined to the rear portion of the at least one of the pair of slide rails, the at least one stopper abutting the at least one extension arm when the at least one extension arm is in the raised position.

In some implementations, the at least one stopper is integral with the rear portion of the at least one of the pair of slide rails.

In some implementations, the pair of slide rails includes a left slide rail and a right slide rail, the at least one extension arm includes a left extension arm pivotally connected to the left slide rail about the pivot axis and a right extension arm pivotally connected to the right slide rail about the pivot axis, the at least one rear idler wheel includes a rear left idler wheel rotationally connected to the left extension arm and a rear right idler wheel rotationally connected to the right extension arm and the at least one biasing member includes a left biasing member biasing the left extension arm and a right biasing member biasing the right extension arm.

In some implementations, the rear suspension assembly further comprises a left stopper joined to the rear portion of the left slide rail, the left stopper abutting the left extension arm when the left extension arm is in the raised position and a right stopper joined to the rear portion of the right slide rail, the right stopper abutting the right extension arm when the right extension arm is in the raised position.

In some implementations, the rail extension assembly further comprises a cross-member extending between the rear portions of the left and right extension arms, the rear left and rear right idler wheels being disposed on the cross-member.

In some implementations, the rail extension assembly further comprises two other rear idler wheels disposed on the cross-member between the left and right extension arms.

In some implementations, the at least one biasing member is at least one spring.

In some implementations, the at least one biasing member is at least one spring washer.

In some implementations, the at least one spring is at least one leaf spring having a front portion connected to the rear portion of the at least one of the pair of slide rails.

In some implementations, a rear portion of the at least one leaf spring is located in an interior of the at least one extension arm.

According to another aspect of the present technology, there is provided a snowmobile comprising a chassis including a tunnel, the tunnel having a longitudinal direction, a motor connected to the chassis, at least one front suspension assembly connected to the chassis, at least one ski connected to the chassis by the at least one front suspension assembly, an endless drive track disposed below the tunnel and being operatively connected to the motor and a rear suspension assembly supporting and tensioning the endless drive track, the chassis being connected to the endless drive track via the rear suspension, the rear suspension assembly comprising at least one suspension arm having a first end and a second end, the first end of the at least one suspension arm being adapted for pivotally connecting to the chassis, a pair of slide rails pivotally connected to the second end of the at least one suspension arm, at least one shock absorber assembly pivotally connected to the pair of slide rails, the at least one shock absorber assembly being adapted for biasing the pair of slide rails away from the chassis, and a rail extension assembly, the rail extension assembly having at least one extension arm having a front end pivotally connected to a rear portion of at least one of the pair of slide rails about a pivot axis, the at least one extension arm being pivotable between a raised position and a lowered position with respect to the pair of slide rails about the pivot axis, at least one rear idler wheel rotationally connected to a rear portion of the at least one extension arm and at least one biasing member biasing the at least one extension arm toward the raised position.

In some implementations, the snowmobile further comprises at least one stopper joined to the rear portion of the at least one of the pair of slide rails, the at least one stopper abutting the at least one extension arm when the at least one extension arm is in the raised position.

In some implementations, the at least one stopper is integral with the rear portion of the at least one of the pair of slide rails.

In some implementations, the pair of slide rails includes a left slide rail and a right slide rail, the at least one extension arm includes a left extension arm pivotally connected to the left slide rail about the pivot axis and a right extension arm pivotally connected to the right slide rail about the pivot axis, the at least one rear idler wheel includes a rear left idler wheel rotationally connected to the left extension arm and a rear right idler wheel rotationally connected to the right extension arm and the at least one biasing member includes a left biasing member biasing the left extension arm and a right biasing member biasing the right extension arm.

In some implementations, the snowmobile further comprises a left stopper joined to the rear portion of the left slide rail, the left stopper abutting the left extension arm when the left extension arm is in the raised position and a right stopper joined to the rear portion of the right slide rail, the right stopper abutting the right extension arm when the right extension arm is in the raised position.

In some implementations, the rail extension assembly further comprises a cross-member extending between the rear portions of the left and right extension arms, the rear left and rear right idler wheels being disposed on the cross-member.

In some implementations, the rail extension assembly further comprises two other rear idler wheels disposed on the cross-member between the left and right extension arms.

In some implementations, the at least one biasing member is at least one leaf spring having a front portion connected to the rear portion of the at least one of the pair of slide rails.

In some implementations, a rear portion of the at least one leaf spring is located in an interior of the at least one extension arm.

In some implementations, when the snowmobile is moving forward, the rail extension assembly experiences an upward biasing force applied by the at least one biasing member and a generally downward force applied by the endless drive track.

In some implementations, when the snowmobile is moving forward above a predetermined speed, tension in the endless drive track applies a generally downward force on the rail extension assembly, the generally downward force being greater than an upward biasing force applied by the at least one biasing member, thereby pivoting the at least one extension arm toward the lowered position.

According to yet another aspect of the present technology, there is provided a snowmobile comprising a chassis including a tunnel, the tunnel having a longitudinal direction, a motor connected to the chassis, at least one front suspension assembly connected to the chassis, at least one ski connected to the chassis by the at least one front suspension assembly, an endless drive track disposed below the tunnel and being operatively connected to the motor and a rear suspension assembly supporting and tensioning the endless drive track, the chassis being connected to the endless drive track via the rear suspension, the rear suspension assembly comprising at least one suspension arm having a first end and a second end, the first end of the at least one suspension arm being adapted for pivotally connecting to the chassis, a pair of slide rails pivotally connected to the second end of the at least one suspension arm, at least one shock absorber assembly pivotally connected to the pair of slide rails, the at least one shock absorber assembly being adapted for biasing the pair of slide rails away from the chassis, and a rail extension assembly, the rail extension assembly having at least one extension arm having a front end pivotally connected to a rear portion of at least one of the pair of slide rails about a pivot axis, the at least one extension arm being pivotable between a raised position and a lowered position with respect to the pair of slide rails about the pivot axis, at least one rear idler wheel rotationally connected to a rear portion of the at least one extension arm, and at least one biasing member biasing the at least one extension arm toward the raised position and wherein when the snowmobile is moving forward above a predetermined speed, tension in the endless drive track applies a generally downward force on the rail extension assembly, the generally downward force being greater than an upward biasing force applied by the at least one biasing member, thereby pivoting the at least one extension arm toward the lowered position.

In some implementations, the snowmobile further comprises at least one stopper joined to the rear portion of the at least one of the pair of slide rails, the at least one stopper abutting the at least one extension arm when the at least one extension arm is in the raised position.

In some implementations, the at least one stopper is integral with the rear portion of the at least one of the pair of slide rails.

In some implementations, the pair of slide rails includes a left slide rail and a right slide rail, the at least one extension arm includes a left extension arm pivotally connected to the left slide rail about the pivot axis and a right extension arm pivotally connected to the right slide rail about the pivot axis, the at least one rear idler wheel includes a rear left idler wheel rotationally connected to the left extension arm and a rear right idler wheel rotationally connected to the right extension arm and the at least one biasing member includes a left biasing member biasing the left extension arm and a right biasing member biasing the right extension arm.

In some implementations, the snowmobile further comprises a left stopper joined to the rear portion of the left slide rail, the left stopper abutting the left extension arm when the left extension arm is in the raised position and a right stopper joined to the rear portion of the right slide rail, the right stopper abutting the right extension arm when the right extension arm is in the raised position.

In some implementations, the rail extension assembly further comprises a cross-member extending between the rear portions of the left and right extension arms, the rear left and rear right idler wheels being disposed on the cross-member.

In some implementations, the rail extension assembly further comprises two other rear idler wheels disposed on the cross-member between the left and right extension arms.

In some implementations, the at least one biasing member is at least one leaf spring having a front portion connected to the rear portion of the at least one of the pair of slide rails.

In some implementations, the at least one biasing member is at least one spring washer.

In some implementations, a rear portion of the at least one leaf spring is located in an interior of the at least one extension arm.

In some implementations, when the snowmobile is moving forward, the rail extension assembly experiences an upward biasing force applied by the at least one biasing member and a generally downward force applied by the endless drive track.

For the purposes of the present application, terms related to spatial orientation such as forward, rearward, front, rear, upper, lower, left, and right, are as they would normally be understood by a driver of the snowmobile sitting thereon in a normal driving position with the vehicle being upright and steered in a straight ahead direction.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 10 is a left side elevation view of the rail extension assembly of FIG. 8;

FIG. 11 is the left side elevation view of FIG. 10, with the rail extension assembly pivoted to a lowered position; and FIG. 12 is a cross-sectional view of the rail extension assembly of FIG. 8, taken along line 12-12 of FIG. 8, with the rail extension assembly pivoted to the lowered position.

It should also be noted that, unless otherwise explicitly specified herein, the drawings are not to scale.

DETAILED DESCRIPTION

The present technology will be described herein with respect to snowmobiles. It is contemplated that aspects of the present suspension assembly could also be applied to other types of tracked vehicles, including, but not limited to, ATVs having endless drive tracks.

Figure 1:
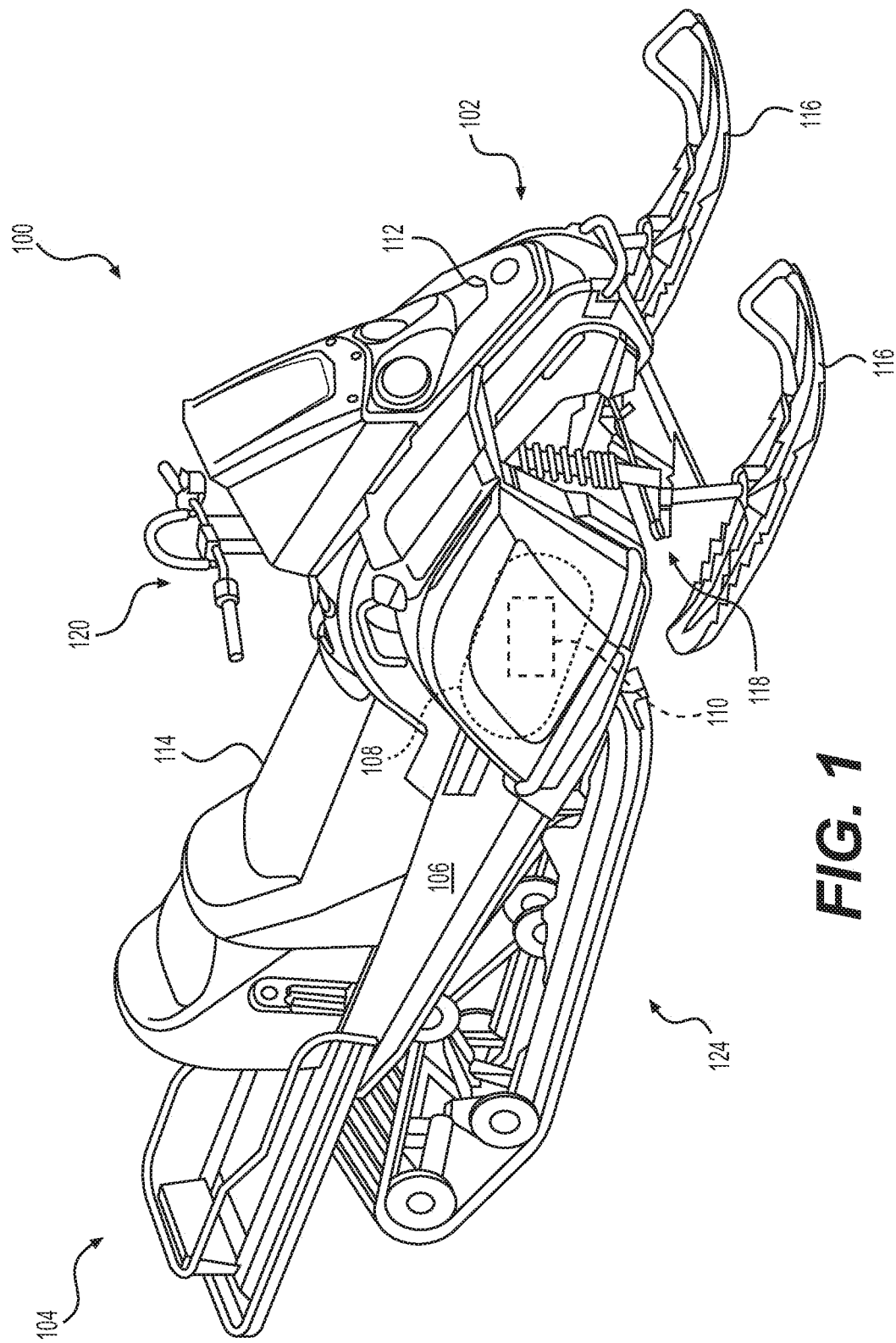
FIG. 1 is a perspective view, taken from a front, right side of a snowmobile having a rear suspension assembly according to one implementation of the present technology.

A snowmobile 100 having a rear suspension assembly 124 is illustrated in FIG. 1. The snowmobile 100 has a front end 102 and a rear end 104. The snowmobile 100 has a chassis including a tunnel 106 and a motor cradle 108 (in dotted lines). A motor 110 (in dotted lines) is supported by the motor cradle 108. It is contemplated that the motor 110 could be different types of motors capable of powering the snowmobile 100, including but not limited to, an internal combustion engine and an electric motor.

A number of fairings 112 are supported on the chassis to provide aesthetic appeal and protect certain components of the snowmobile 100. A seat 114 is provided above the tunnel 106 for accommodating a driver and one passenger. It is also contemplated that a seat 114 could accommodate only the driver or the driver and more than one passenger.

Two skis 116 at the front end 102 of the snowmobile 100 are connected to the chassis via a front suspension system 118. It is contemplated that the snowmobile 100 could have only one ski or multiple skis connected via the front suspension system 118. A steering assembly 120 is provided generally forward of the seat 114, and is operatively connected to the skis 116 such that turning the steering assembly 120 turns the skis 116 to steer the snowmobile 100.

Figure 2:
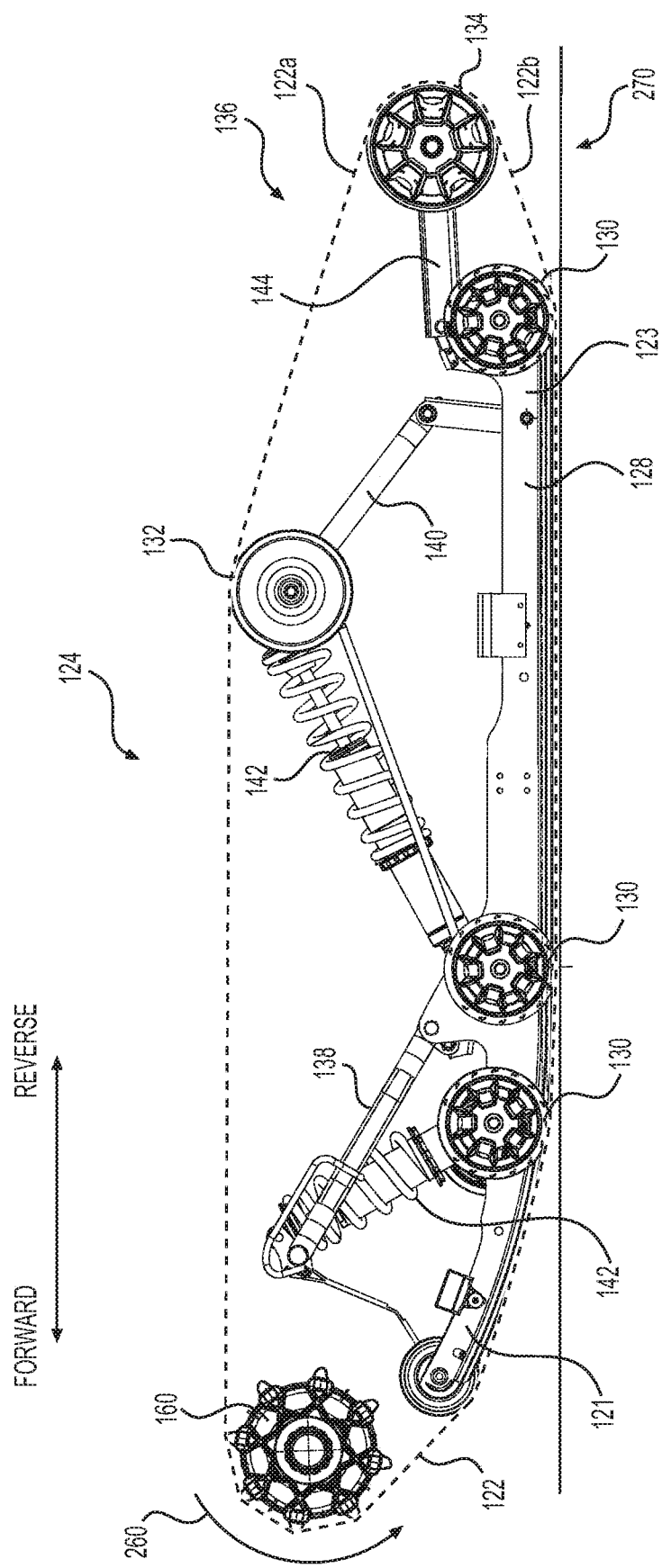
FIG. 2 is a left side elevation view of a rear suspension assembly having a rail extension assembly of the snowmobile of FIG. 1.
Figure 3:
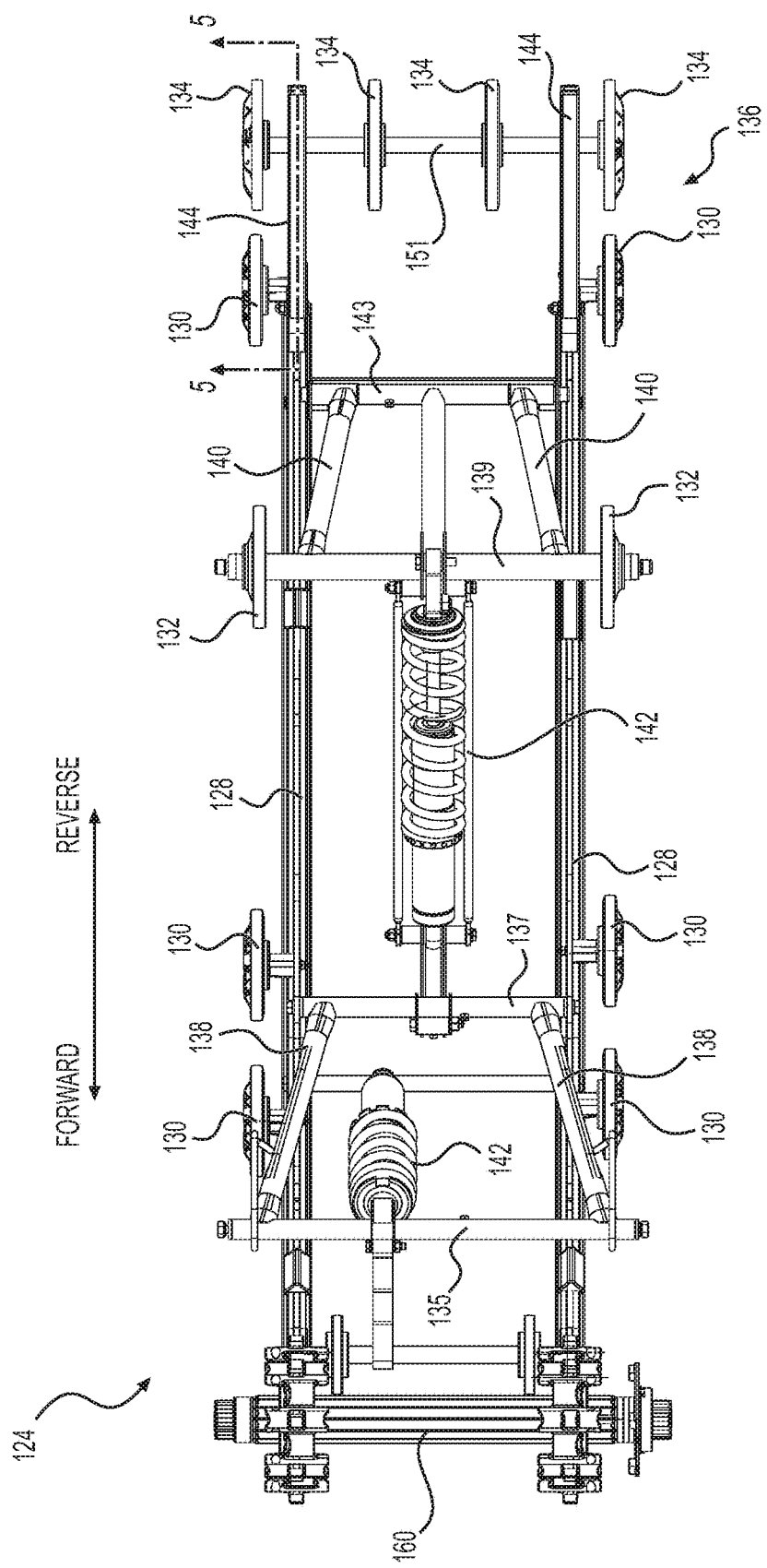
FIG. 3 is a top plan view of the rear suspension assembly having the rail extension assembly of FIG. 2.

The rear suspension assembly 124 is illustrated in FIGS. 2 and 3. An endless drive track 122 is partially disposed in the tunnel 106 and is supported by the rear suspension assembly 124. The endless drive track 122 is driven by a sprocket 160. The sprocket 160 is driven the motor 110 via a transmission (not shown) to propel the snowmobile 100. The endless drive track 122 is illustrated schematically in dotted lines in FIG. 2.

The rear suspension assembly 124 includes a pair of slide rails 128 that generally position and guide the endless drive track 122, the pair of slide rails 128 being specifically a right slide rail 128 and a left slide rail 128. The slide rails 128 have a curved forward end 121 to follow the endless drive track 122 and a flat bottomed rear portion 123 to ensure proper traction between the endless drive track 122 and the ground. The rear portions 123 of the slide rails 128 each have a plate 129, which is a raised portion of the rear portions 123. Differently shaped slide rails 128 are also within the scope of the present technology.

The rear suspension assembly 124 is connected to the chassis via the tunnel 106 (shown in FIG. 1) via two front suspension arms 138 and two rear suspension arms 140. The front suspension arms 138 are pivotally connected to the tunnel 106 at their upper ends via a laterally extending bar 135, and pivotally connected to the pair of slide rails 128 at their lower ends via a laterally extending bar 137. It is contemplated that the rear suspension assembly 124 could include only one or more than two front suspension arms 138. The rear suspension arms 140 are pivotally connected to the tunnel 106 at their upper ends via a laterally extending bar 139, and pivotally connected to an upper end of a rocker arm 143 at their lower ends. The lower ends of the rocker arm 143 are pivotally connected to the pair of slide rails 128. It is contemplated that the rear suspension assembly 124 could include only one or more than two rear suspension arms 140.

Two shock absorber assemblies 142 bias the pair of slide rails 128 downward against the endless drive track 122 to ensure proper contact therebetween. Rear suspension assemblies 124 constructed with a single shock absorber assembly 142 or with more than two shock absorber assemblies 142 are also contemplated.

Three pairs of lower wheels 130 and one pair of upper wheels 132 engage the endless drive track 122 to further guide the endless drive track 122. Four idler wheels 134 are supported on a rail extension assembly 136 to further guide the track 122, as will be described in more detail below with respect to FIGS. 4 to 6. It is contemplated that the rear suspension assembly 124 could be provided with more or less lower wheels 130, upper wheels 132 and/or idler wheels 134 than illustrated.

Figure 4:
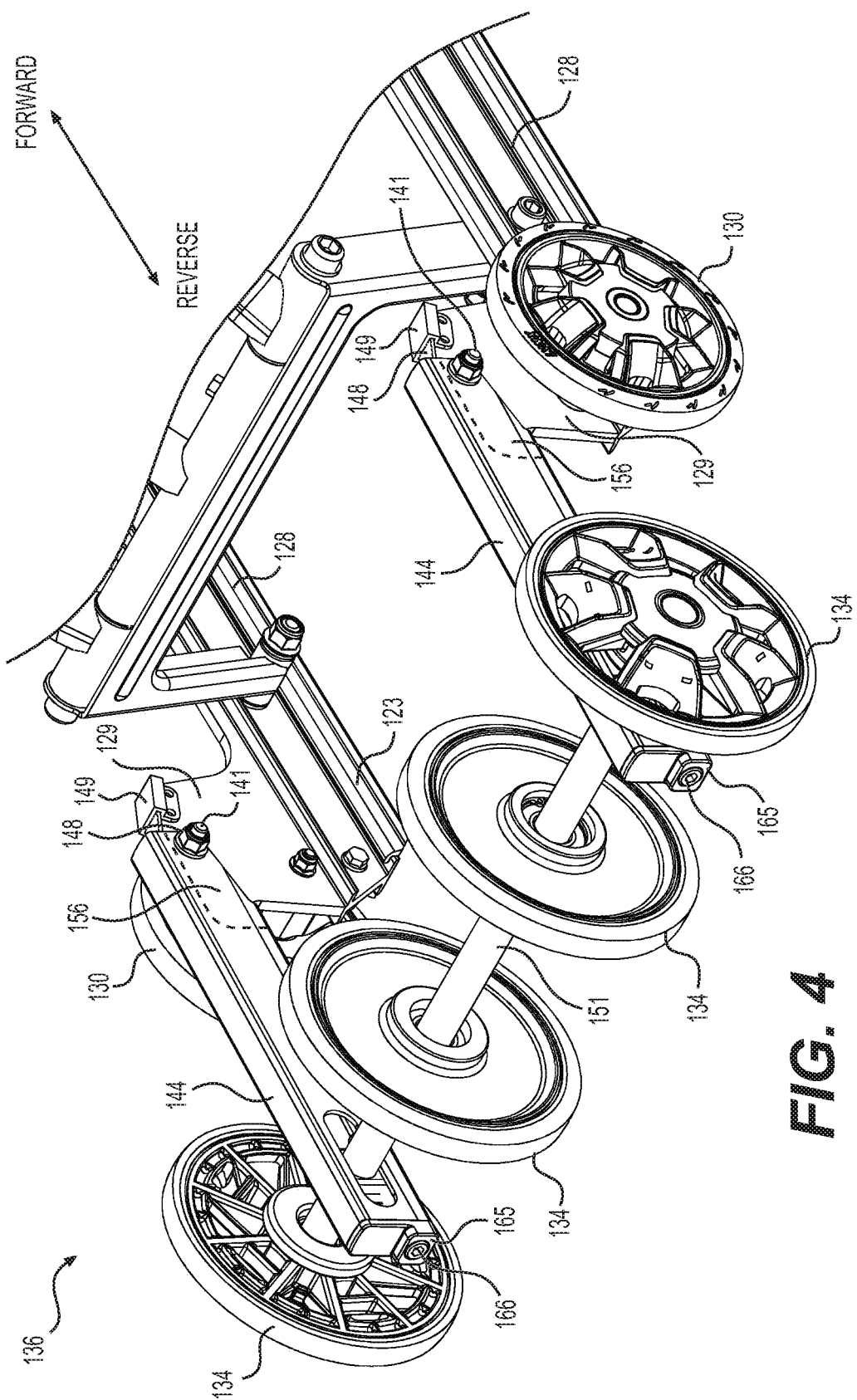
FIG. 4 is a perspective view, taken from a rear, right side of the rail extension assembly of FIG. 2.

The rail extension assembly 136 is an articulated rearward portion of the rear suspension assembly 124 and will now be described with respect to FIGS. 4 to 6. The rail extension assembly 136 has a right extension arm 144 and a left extension arm 144 connected to the rear portions 123 of the right and left slide rails 128 respectively. The rail extension assembly 136 pivots about the pivot axis 146 at the pivot point 141, where the extension arms 144 connect to the rear portions 123. The rail extension assembly 136 pivots between a raised position (seen in FIG. 5) and a lowered position (seen in FIG. 6) with respect to the pair of slide rails 128. It is contemplated that the rail extension assembly 136 could include more or less than two extension arms 144. It is also contemplated that the rail extension assembly 136 could pivot about a pivot point 141 located elsewhere than the rear portion 123 of the slide rails 128.

One idler wheel 134 is rotationally connected to the right of the right extension arm 144 and another idler wheel 134 is similarly rotationally connected to the left of the left extension arm 144. Both of the rear idler wheels 134 are disposed on a cross-member 151 passing through a rear portion of the extension arms 144, thereby rotationally connecting the rear idler wheels 134 to the extension arms 144. Another two idler wheels 134 are disposed on the cross-member 151, between the two extension arms 144. As described above, it is contemplated that more or less than four idler wheels 134 could be included. It is also contemplated that some implementations could include only one pair of exterior idler wheels 134, with a right idler wheel 134 disposed to the right side of the right extension arm 144 and a left idler wheel 134 disposed to the left side of the left extension arm 144. It is further contemplated that some implementations could include only one pair of interior idler wheels 134, with a right idler wheel 134 disposed to the left side of the right extension arm 144 and a left idler wheel 134 being disposed to the right side of the left extension arm 144.

A right biasing member 148 and a left biasing member 148 are included for the right and left extension arms 144 to bias the rail extension assembly 136 toward the raised position. As illustrated in FIGS. 5 and 6 for the right extension arm 144, the biasing members 148 are leaf springs 148. It is contemplated that different forms of biasing members 148 may be implemented, including, but not limited to, torsion springs, coil springs, and resilient material. The leaf springs 148 will be discussed below in relation to the right extension arm 144; the details also apply mutatis mutandis to the left extension arm 144.

A front end of the leaf spring 148 is connected to the plate 129 of the rear portion 123 of the right slide rail 128. The leaf spring 148 is anchored by a bracket 149 to a top of the plate 129. As the top of the plate 129 of the right slide rail 128 is slanted slightly upwards (as seen in FIG. 5), the leaf spring 148 extends rearward and upward from its front end until it reaches the right extension arm 144. The rear end of the leaf spring 148 is disposed in an interior space 145 defined by the right extension arm 144. The weight of the right extension arm 144, along with all the components connected to it (including the rear idler wheels 134), applies a force in the generally downward direction, acting against the rear end of the leaf spring 148 in the interior 145 of the right extension arm 144. The leaf spring 148 is calibrated to apply enough generally upward force to the right extension arm 144 such that the weight is at least balanced and such that in a static situation, the right extension arm 144 remains in the raised position, as illustrated by FIG. 5.

Figure 5:
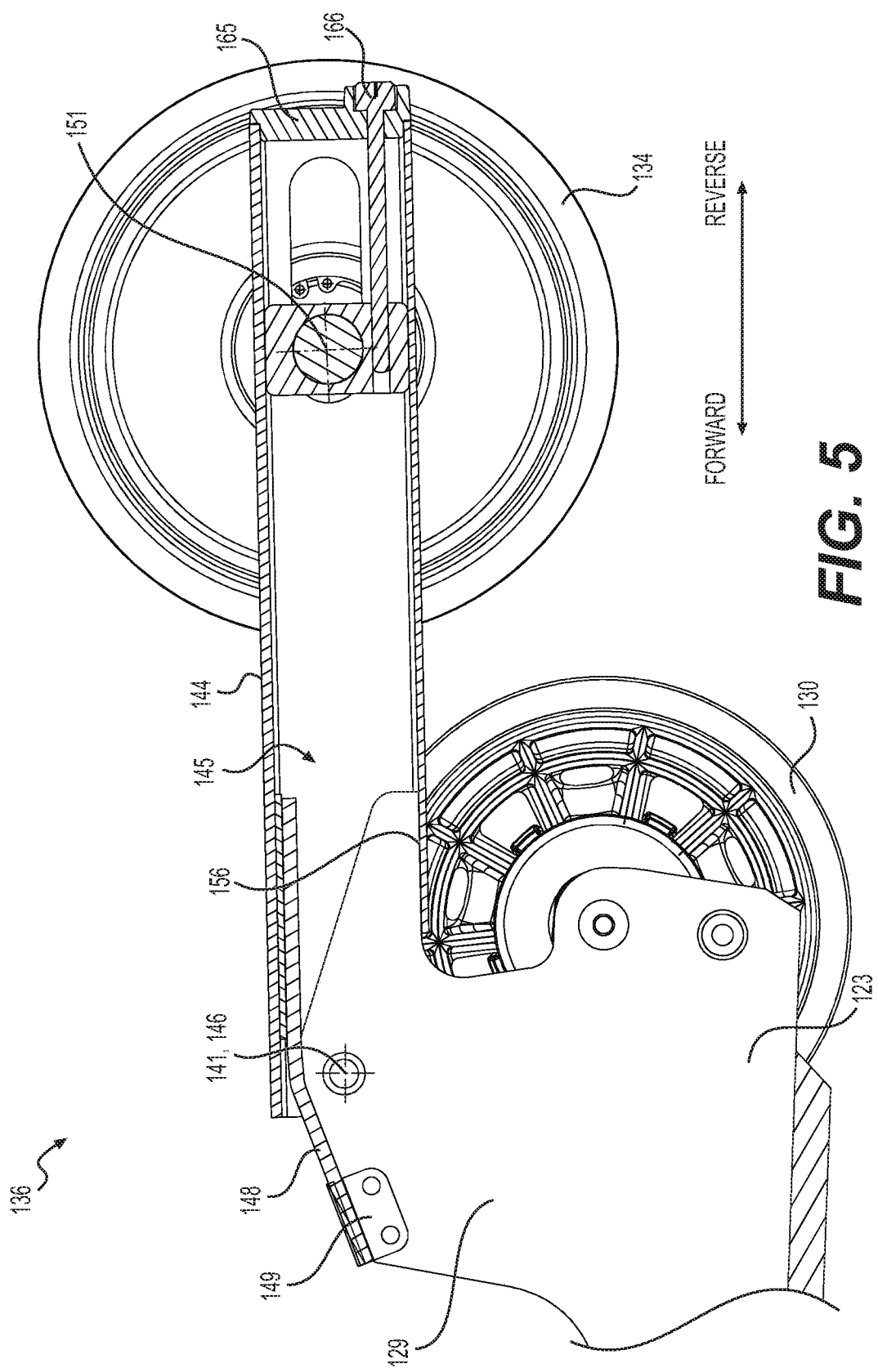
FIG. 5 is a cross-sectional view of the rail extension assembly of FIG. 2, taken along line 5-5 of FIG. 3.

As seen in FIG. 5, a right stopper 156 integral to the plate 129 of the rear portion 123 of the right slide rail 128 is provided to limit the upward motion of the right extension arm 144. Equally there is a left stopper 156 provided for the left extension arm 144 (shown in dotted lines in FIG. 4). The position where the extension arms 144 abut their respective stoppers 156 defines the raised position. It is contemplated that the stopper could take multiple other forms, including, but not limited to, an abutment mechanically joined to one or both slide rails 128, a stopper or an abutment external to the extension arms 144, and a stopper 156 associated with the biasing member 148. It is also contemplated that the stoppers 156 could be coated with a resilient material, such as rubber, to cushion the impacts of the movement of the rail extension arms 144 thereon while the snowmobile 100 is in operation. It is further contemplated that, in some implementations, the plate 129 could not include the stopper 156 and the extension arms 144 could move beyond the "raised" position.

In the raised position, the rear portion of the rear suspension assembly 124 is in a position for reversing, either in standard conditions, for soft snow or for passing over bumps or obstacles. Additionally, having the rear portion of the rear suspension assembly 124 in the raised position is also desirable under certain operating conditions where the snowmobile 100 moves forward. When the snowmobile 100 has a shorter portion of the endless drive track 122 in contact with the ground, the snowmobile 100 is easier to steer, which could be desirable when traversing hard-packed snow.

Figure 6:
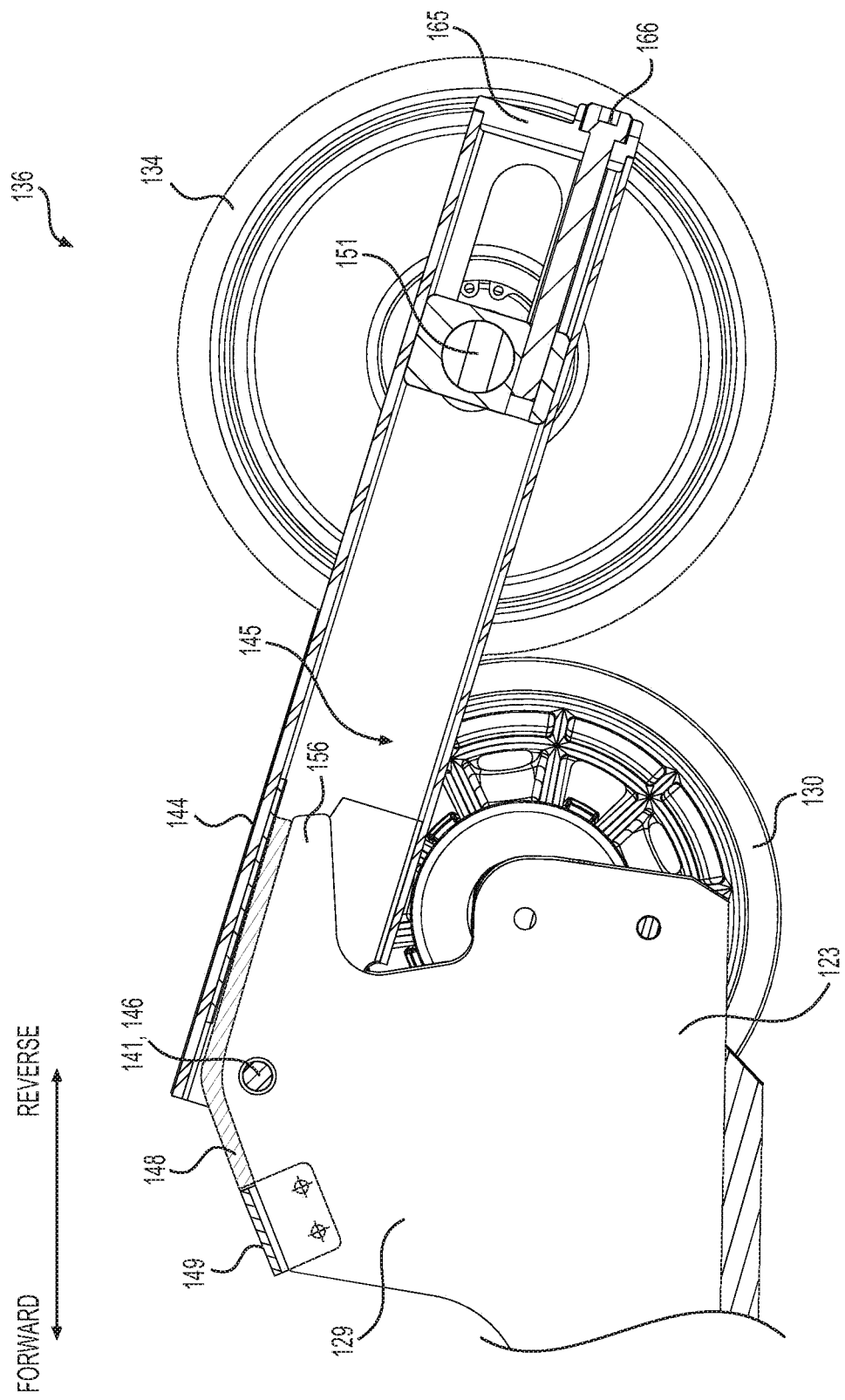
FIG. 6 is a cross-sectional view of the rail extension assembly of FIG. 2, taken along line 5-5 of FIG. 3, with the rail extension assembly pivoted to the lowered position.

In FIG. 6, the rail extension assembly 136 is shown in the lowered position. Details of how the rail extension assembly 136 is pivoted toward the lowered position will be discussed more thoroughly below. It is contemplated that the lowered position could be limited in several ways, including but not limited to: by contact between the extension arms 144 and the plate 129 and by an additional lower stopper. Additionally, tension in the endless drive track 122 in standard operation may also limit the lowered position of the rail extension assembly 136. It is contemplated that one or more stoppers providing additional limits on the downward motion of the rail extension assembly 136 could be included. It is contemplated that the stoppers 156 could be configured to also limit the downward motion of the rail extension assembly 136.

It should be noted that depending on conditions of operation of the snowmobile 100, the rail extension assembly 136 may also be found in a position between the raised position and the lowered position. The raised and lowered positions are merely meant to describe the limits of the range of motion of the rail extension assembly 136.

The static position of the rail extension assembly 136 will depend in part on the static tension of the endless drive track 122 around the rear suspension assembly 124, the specifics of which will be discussed below. The tension of the endless drive track 122 is adjustable via a tensioner 165 on each of the right and left extension arms 144. By turning an adjustment screw 166 in the tensioner 165, the cross-member 151 (and thus the idler wheels 134 disposed thereon) is shifted rearward or forward in a slot 167 in the extension arms 144. By shifting the cross-member 151 rearward by the tensioner 165, the tension is increased in the endless drive track 122, as the rear suspension assembly 124 has a larger overall perimeter and the endless drive track 122 will be more tightly fit around it. Shifting the cross-member 151 forward in the slot 167 similarly reduces the tension in the endless drive track 122, as the perimeter of the rear suspension assembly 124 is smaller and the endless drive track 122 is less tightly fit around the rear suspension assembly 124.

The tension in the endless drive track 122 is also affected by operating conditions when the snowmobile 100 is in use. The details of how the rail extension assembly 136 is pivoted toward the lowered position by the tension in the endless drive track 122 will now be discussed with respect to FIGS. 2 and 7.

When the snowmobile 100 is operated in the forward direction, tension in the endless drive track 122 is increased. First, the sprocket 160 driving the endless drive track 122 in the direction 260 (as illustrated in FIG. 2) increases the tension in an upper region 122a of the endless drive track 122 and causes a force pulling in the forward direction with respect to the snowmobile 100. In a lower region 122b of the endless drive track 122, tension increases due to the endless drive track's 122 engagement with the ground, creating a pulling force also pulling in the forward direction. Certain operating conditions of the snowmobile 100 can lead to more tension in the drive track 122, including but not limited to: operating above a certain forward speed, operating in deep snow and towing a load behind the snowmobile 100.

Figure 7:
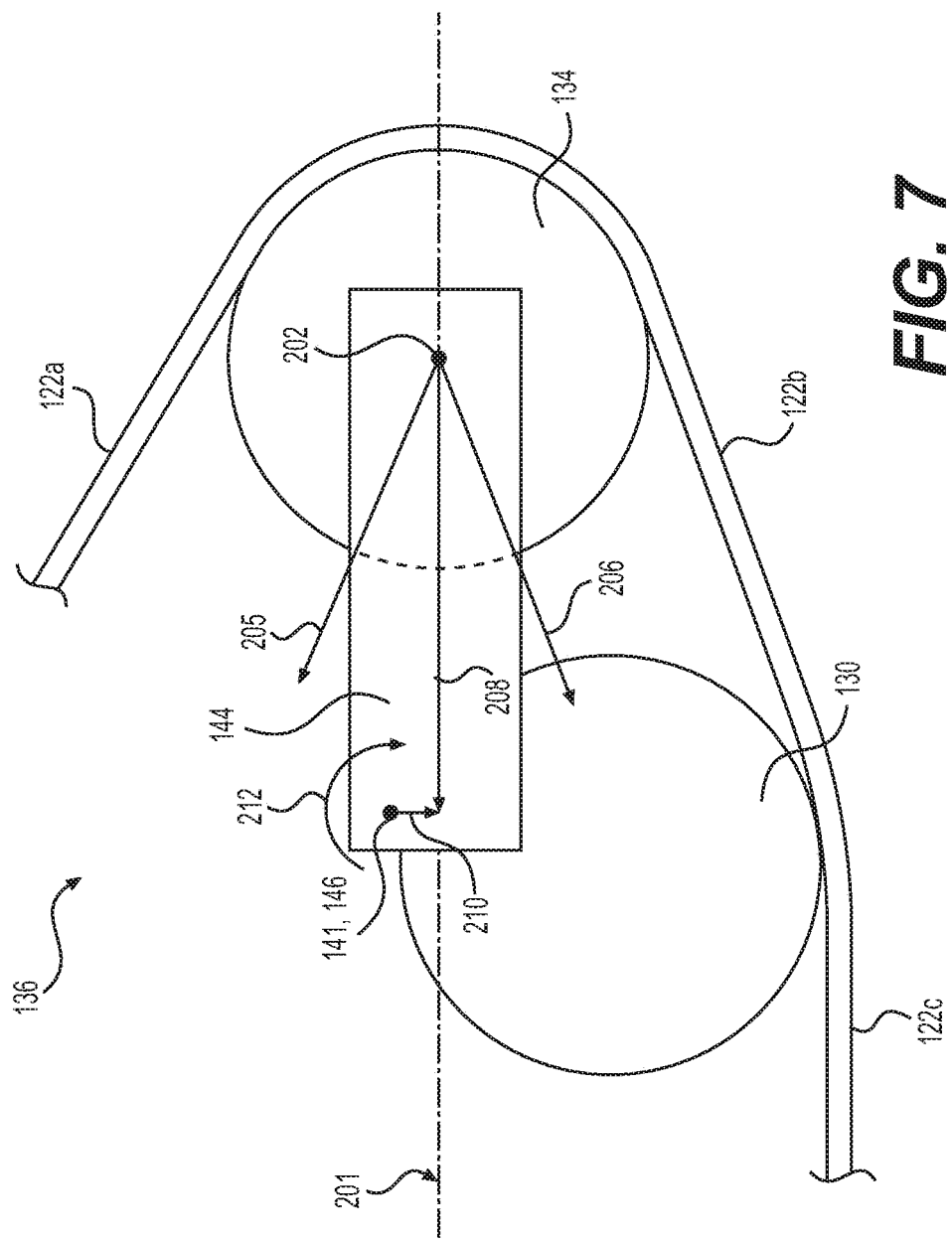
FIG. 7 is a schematic illustration of the rail extension assembly of FIG. 4.
Figure 8:
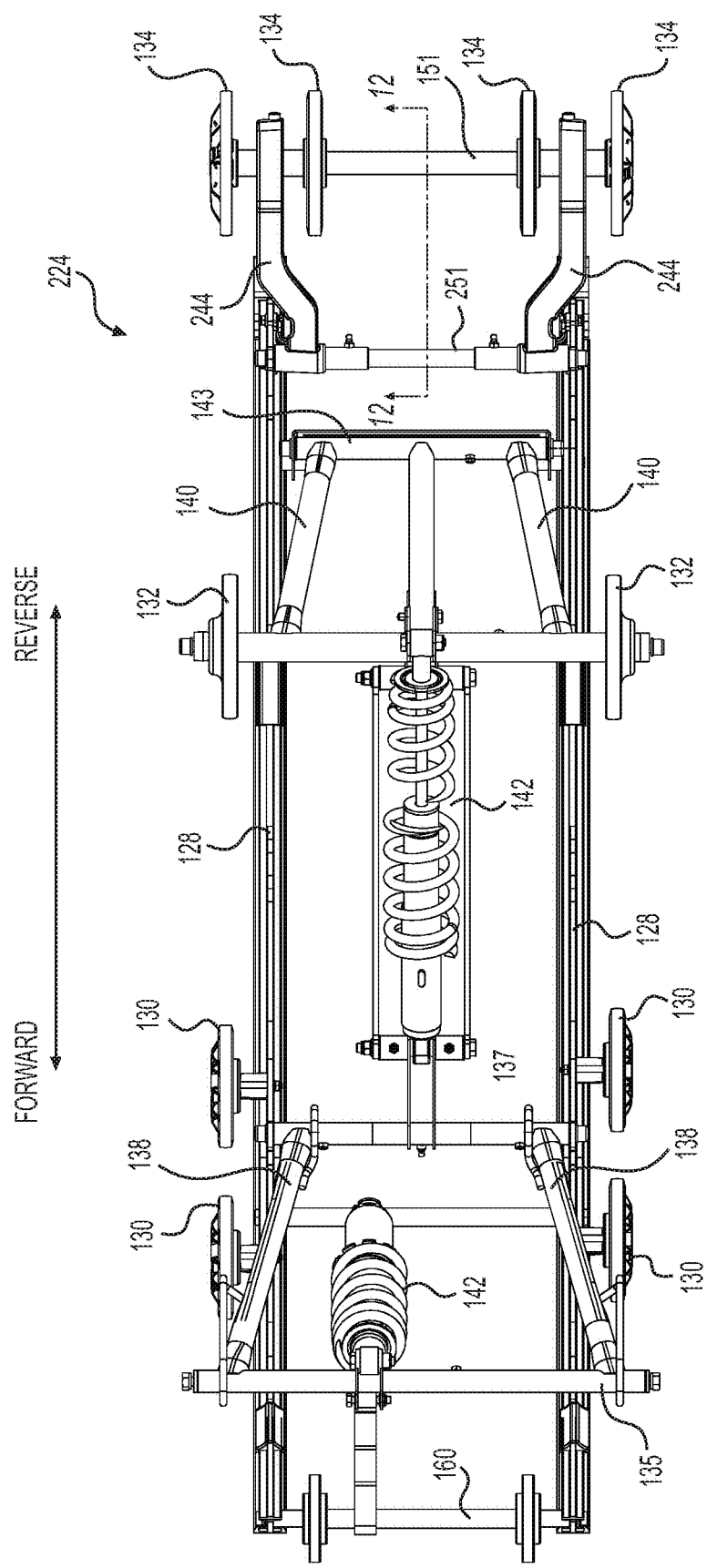
FIG. 8 is a top plan view of a rear suspension assembly having a rail extension assembly according to another implementation of the present technology.
Figure 9:
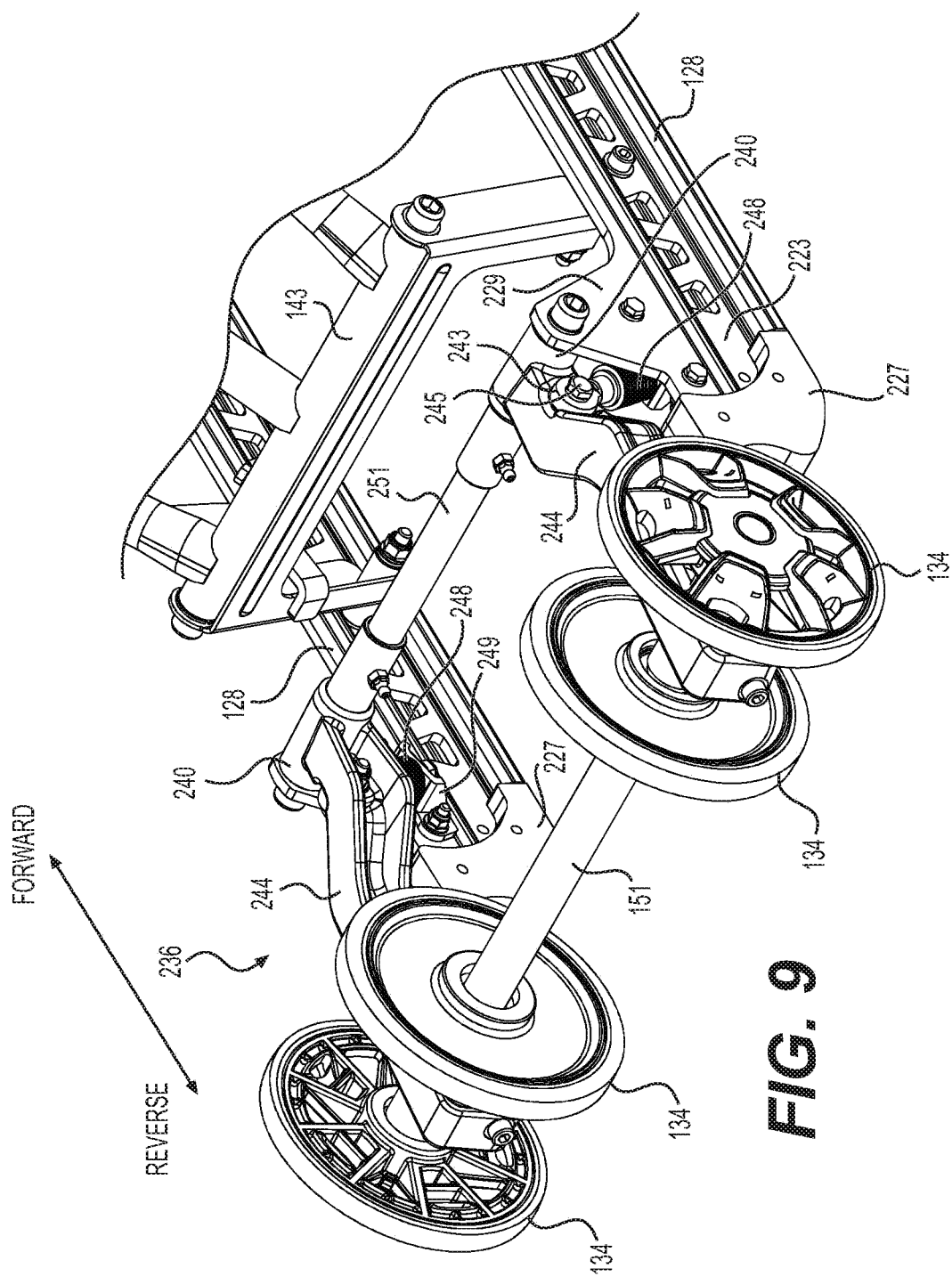
FIG. 9 is a perspective view, taken from a rear, right side of the rail extension assembly of FIG. 8.

As seen in FIG. 7, where the rail extension assembly 136 is drawn schematically for clarity, a force 205 acts upon each idler wheel 134 from the upper region 122a, which can be considered to act upon the rear idler wheel 134 at its center point 202. Another force 206 acts upon each rear idler wheel 134 at its center point 202 from the lower region 122b. The sum of these two forces 205 and 206 is represented as resulting force 208, which pulls the rear idler wheels 134 in generally horizontal and forward directions.

As the resulting force 208 emanates from the center point 202 of the idler wheel 134 and is generally horizontally oriented, a torque 212 is applied to the extension arm 144. As the center point 202 of the idler wheels 134 is lower than the pivot axis 146 of the extension arms 144, there is a lever arm 210 between the pivot axis 146 and the axis of the resulting force 208, illustrated by the arrow 210 originating at the pivot axis 146 and ending at the line 201 transecting the center 202 of the rear idler wheel 134. It should be noted that the lever arm 210 is a mathematical construct to describe the offset between a pivot point 141 and an applied force 208, and does not represent a physical element of the present implementation.

The arrangement of the lever arm 210 and the resulting force 208 results in the torque 212 in the direction indicated in FIG. 7, where increasing tension in the endless drive track 122 as described above increases the torque 212. The direction of the torque 212 biases the extension arms 144 in a generally downward direction, toward the lowered position. If the torque 212 reaches a given magnitude, it will urge the rail extension assembly 136 toward the lowered position (seen in FIG. 6), at least partially overcoming the upward biasing force exerted by the leaf spring 148.

As discussed above, the leaf spring 148 is calibrated to provide enough upward biasing force such that the extension arms 144 and thus the rail extension assembly 136 remains generally in the raised position during certain operating conditions of the snowmobile 100, including when the snowmobile 100 moves rearward, and when the snowmobile 100 is at rest. The leaf spring 148 is simultaneously calibrated to also allow the rail extension assembly 136 to be pulled down if enough torque 212 is induced. In cases where the tension and thus torque 212 increases above a certain threshold, the rail extension assembly 136 is pulled down to the lowered position, such that the portion of the endless drive track 122 extending between the rear wheels 130 and the idler wheels 134 engages with the ground and helps propel the snowmobile 100 forward. Often, cases where the tension greatly increases correspond to situations where a longer endless drive track 122 would be advantageous, including but not limited to: operating above a certain forward speed, operating in deep snow and towing a load behind the snowmobile.

Another implementation of a rail extension assembly 236 of a rear suspension assembly 224 will now be described with respect to FIGS. 8 to 12. The rail extension assembly 236 has a right extension arm 244 and a left extension arm 244. The extension arms 244 connect to a forward cross-member 251 via forward portions 240 of the extension arms 244. The forward cross-member 251 connects to and extends between raised plates 229 of rear portions 223 of the right and left slide rails 128. The rail extension assembly 236 pivots about a pivot axis 246 at a pivot point 241, where the forward cross-member 251 connects to the rear portions 223. The extension arms 244 rotate about the forward cross-member 251. The rail extension assembly 236 pivots between a raised position (seen in FIG. 10) and a lowered position (seen in FIGS. 11 and 12) with respect to the pair of slide rails 128.

A right biasing member 248 and a left biasing member 248 are included for the right and left extension arms 244 to bias the rail extension assembly 236 toward the raised position. As illustrated in FIGS. 10 to 12 for the left extension arm 244, the biasing members 248 are spring washers 248. The left extension arm 244 and the left spring washer 248 will be discussed below; the details also apply mutatis mutandis to the right extension arm 244 and right spring washer 248.

The left extension arm 244 is biased toward the raised position by the left spring washers 248. The washers 248 are disposed around an eye bolt 245. A top end of the eye bolt 245 is fastened to the extension arm 244 by a bolt 243, but it is contemplated that another type of fastener could be used. The eye bolt 245 connects, via a nut 247, to a bracket 249 fastened to the rear portion 223 of the left slide rail 128. The bracket 249 is fastened by two bolts, but it is contemplated that the bracket 249 could be fastened to the slide rail 128 by different means, including, for example, rivets. It is also contemplated that the eye bolt 245 could be fastened directly to the slide rail 128.

Similarly to the leaf springs 148 discussed above, the spring washers 248 are calibrated to provide enough upward biasing force such that the extension arms 244 and thus the rail extension assembly 236 remains generally in the raised position during certain operating conditions of the snowmobile 100, including when the snowmobile 100 moves rearward, and when the snowmobile 100 is at rest. The spring washers 248 are simultaneously calibrated to also allow the rail extension assembly 236 to be pulled down if enough torque 212 is induced.

For the rail extension assembly 236, the raised position is defined by the length of the eye bolt 245. As the distance between the eye of the eye bolt 245 and the nut 247 holding the eye bolt 245 in the bracket 249 is rigid, this limits the upward motion of the rail extension assembly 236. It is contemplated that the eye bolt 245 and the nut 247 could be arranged such that the rail extension assembly 236 could have higher or lower raised positions than that illustrated in the Figures. The lowered position of the rail extension assembly 236 is defined by plastic end caps 227 of the slide rails 128. When the rail extension assembly 236 are pulled downward by tension in the endless track 122, the assembly 236 abuts a top side of the plastic end caps 227. It is contemplated that the end caps 227 could be integral with the slide rails 128. It is also contemplated that the rail extension assembly 236 could abut the slide rails 128 directly.

Remaining components of the rear suspension assembly 224 and the rail extension assembly 236 are identical to those discussed with respect to the rear suspension assembly 124 and the rail extension assembly 136 and need not be repeated here. Further, details of how the rail extension assembly 236 is pivoted toward the lowered position by the tension in the endless drive track 122 are generally the same as those discussed with respect to the rail extension assembly 136 and need not be repeated here.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
   a chassis including a tunnel, the tunnel having a longitudinal direction;
   a motor connected to the chassis;
   at least one front suspension assembly connected to the chassis;
   at least one ski connected to the chassis by the at least one front suspension assembly;
   an endless drive track disposed below the tunnel and being operatively connected to the motor; and
   a rear suspension assembly supporting and tensioning the endless drive track, the chassis being connected to the endless drive track via the rear suspension, the rear suspension assembly comprising:
   at least one suspension arm having a first end and a second end, the first end of the at least one suspension arm being adapted for pivotally connecting to the chassis,
   a pair of slide rails pivotally connected to the second end of the at least one suspension arm,
   at least one shock absorber assembly pivotally connected to the pair of slide rails, the at least one shock absorber assembly being adapted for biasing the pair of slide rails away from the chassis, and
   a rail extension assembly, the rail extension assembly having:
   at least one extension arm having a front end pivotally connected to a rear portion of at least one slide rail of the pair of slide rails about a pivot axis, the at least one extension arm being pivotable between a raised position and a lowered position with respect to the pair of slide rails about the pivot axis,
   at least one rear idler wheel rotationally connected to a rear portion of the at least one extension arm, and
   at least one biasing member biasing the at least one extension arm toward the raised position, the at least one biasing member being operatively connected between the rear portion of the at least one slide rail of the pair of slide rails and the at least one extension arm, the at least one biasing member being supported between the at least one slide rail of the pair of slide rails and the at least one extension arm by first and second fasteners, the first fastener being fastened to the at least one slide rail of the pair of slide rails, and the second fastener being fastened to the at least one extension arm.

2. The snowmobile of claim 1, wherein:
   the pair of slide rails includes a left slide rail and a right slide rail;
   the at least one extension arm includes a left extension arm pivotally connected to the left slide rail about the pivot axis and a right extension arm pivotally connected to the right slide rail about the pivot axis;
   the at least one rear idler wheel includes a rear left idler wheel rotationally connected to the left extension arm and a rear right idler wheel rotationally connected to the right extension arm; and
   the at least one biasing member includes a left biasing member biasing the left extension arm and a right biasing member biasing the right extension arm.

3. The snowmobile of claim 2, wherein the rail extension assembly further comprises a cross-member extending between the rear portions of the left and right extension arms, the rear left and rear right idler wheels being disposed on the cross-member.

4. The snowmobile of claim 1, wherein the at least one biasing member is at least one spring washer.

5. The snowmobile of claim 1, wherein when the snowmobile is moving forward, the rail extension assembly experiences an upward biasing force applied by the at least one biasing member and a generally downward force applied by the endless drive track.

6. The snowmobile of claim 1, wherein when the snowmobile is moving forward above a predetermined speed, tension in the endless drive track applies a generally downward force on the rail extension assembly, the generally downward force being greater than an upward biasing force applied by the at least one biasing member, thereby pivoting the at least one extension arm toward the lowered position.

7. A snowmobile comprising:
a chassis including a tunnel, the tunnel having a longitudinal direction;
a motor connected to the chassis;
at least one front suspension assembly connected to the chassis;
at least one ski connected to the chassis by the at least one front suspension assembly;
an endless drive track disposed below the tunnel and being operatively connected to the motor; and
a rear suspension assembly supporting and tensioning the endless drive track, the chassis being connected to the endless drive track via the rear suspension, the rear suspension assembly comprising:
at least one front suspension arm having a first end and a second end, the first end of the at least one front suspension arm being pivotally connected to the chassis,
a pair of slide rails pivotally connected to the second end of the at least one front suspension arm,
at least one rear suspension arm having a first end and a second end, the at least one rear suspension arm being disposed rearward of the at least one front suspensions arm, the first end of the at least one rear suspension arm being pivotally connected to the chassis, the second end of the at least one rear suspension arm being pivotally connected to the pair of slide rails,
at least one shock absorber assembly pivotally connected to the pair of slide rails, the at least one shock absorber assembly being adapted for biasing the pair of slide rails away from the chassis, and
a rail extension assembly, the rail extension assembly having:
at least one extension arm having a front end pivotally connected to a rear portion of at least one slide rail of the pair of slide rails about a pivot axis, the pivot axis being disposed rearward of the second end of the at least one rear suspension arm, the at least one extension arm being pivotable between a raised position and a lowered position with respect to the pair of slide rails about the pivot axis,
at least one rear idler wheel rotationally connected to a rear portion of the at least one extension arm, and
at least one biasing member biasing the at least one extension arm toward the raised position, and
wherein when the snowmobile is moving forward above a predetermined speed, tension in the endless drive track applies a generally downward force on the rail extension assembly, the generally downward force being greater than an upward biasing force applied by the at least one biasing member, thereby pivoting the at least one extension arm toward the lowered position.

8. The snowmobile of claim 7, further comprising at least one stopper joined to the rear portion of the at least one slide rail of the pair of slide rails, the at least one stopper abutting the at least one extension arm when the at least one extension arm is in the raised position.

9. The snowmobile of claim 8, wherein the at least one stopper is integral with the rear portion of the at least one of the pair of slide rails.

10. The snowmobile of claim 7, wherein:
the pair of slide rails includes a left slide rail and a right slide rail;
the at least one extension arm includes a left extension arm pivotally connected to the left slide rail about the pivot axis and a right extension arm pivotally connected to the right slide rail about the pivot axis;
the at least one rear idler wheel includes a rear left idler wheel rotationally connected to the left extension arm and a rear right idler wheel rotationally connected to the right extension arm; and
the at least one biasing member includes a left biasing member biasing the left extension arm and a right biasing member biasing the right extension arm.

11. The snowmobile of claim 10, further comprising:
a left stopper joined to the rear portion of the left slide rail, the left stopper abutting the left extension arm when the left extension arm is in the raised position; and
a right stopper joined to the rear portion of the right slide rail, the right stopper abutting the right extension arm when the right extension arm is in the raised position.

12. The snowmobile of claim 10, wherein the rail extension assembly further comprises a cross-member extending between the rear portions of the left and right extension arms, the rear left and rear right idler wheels being disposed on the cross-member.

13. The snowmobile of claim 12, wherein the rail extension assembly further comprises two other rear idler wheels disposed on the cross-member between the left and right extension arms.

14. The snowmobile of claim 7, wherein the at least one biasing member is at least one spring washer.

15. The snowmobile of claim 7, wherein the at least one biasing member is at least one leaf spring having a front portion connected to the rear portion of the at least one of the pair of slide rails.

16. The snowmobile of claim 15, wherein a rear portion of the at least one leaf spring is located in an interior of the at least one extension arm.

17. The snowmobile of claim 7, wherein when the snowmobile is moving forward, the rail extension assembly experiences an upward biasing force applied by the at least one biasing member and a generally downward force applied by the endless drive track.

* * * * *